UNITED STATES PATENT OFFICE.

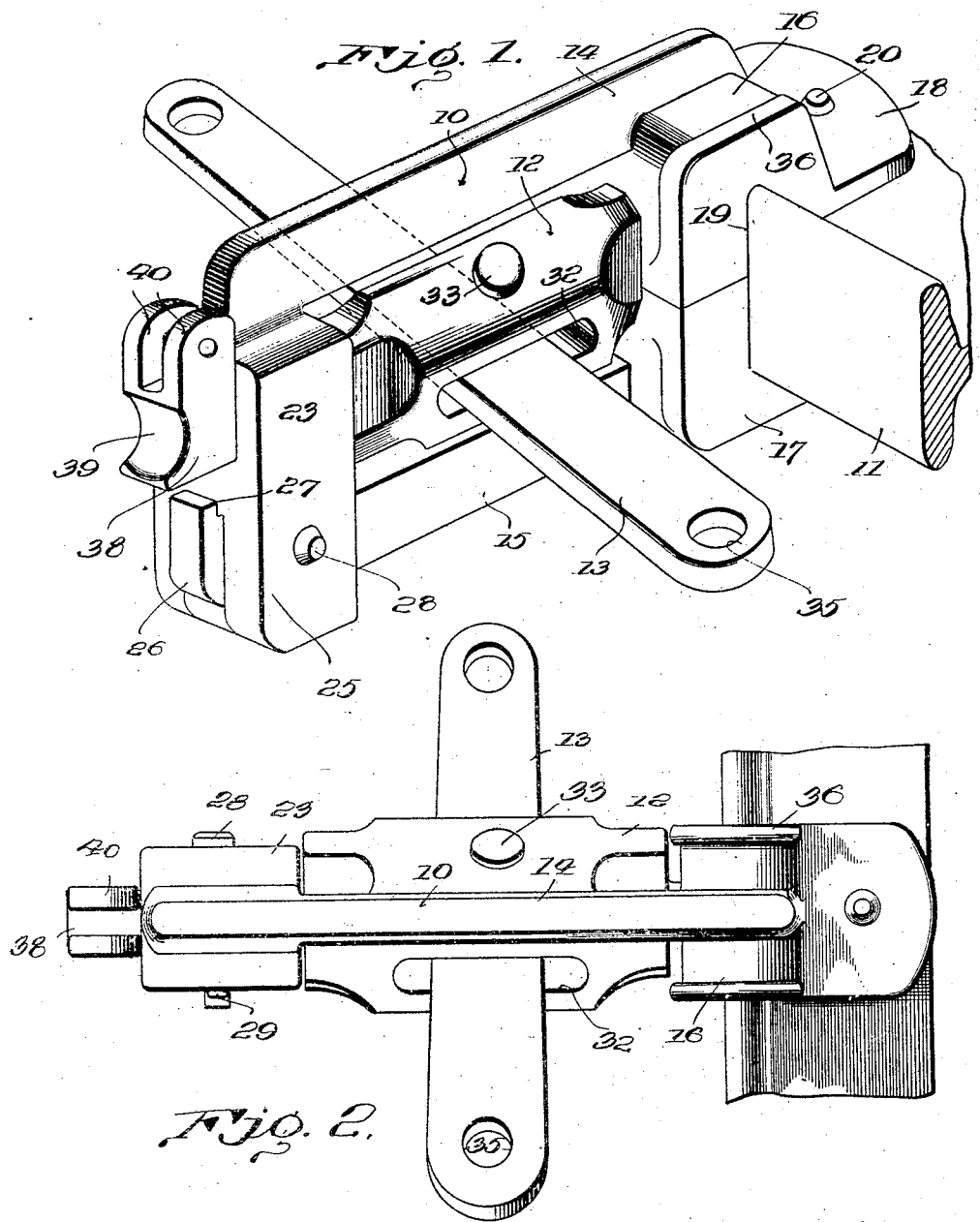

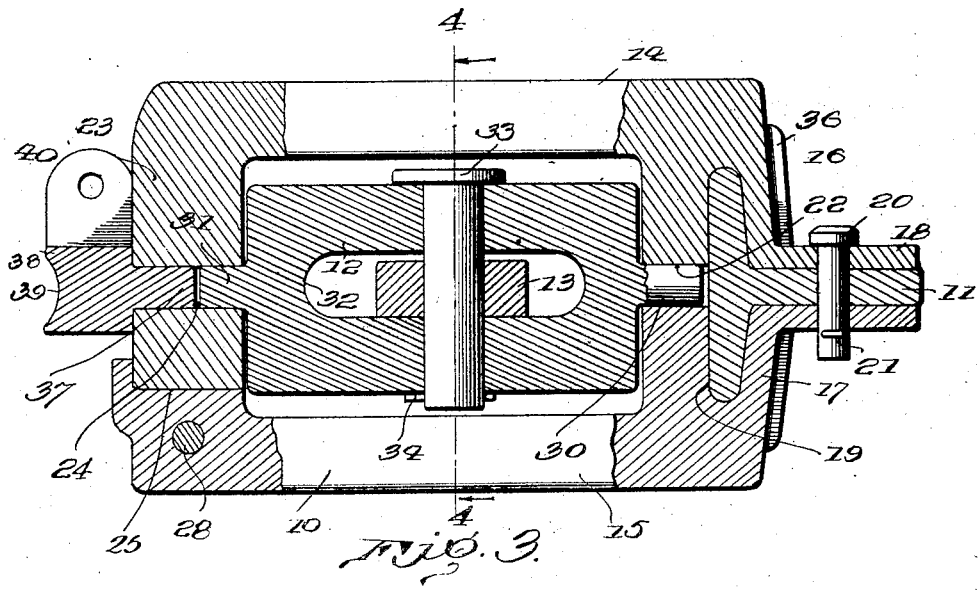
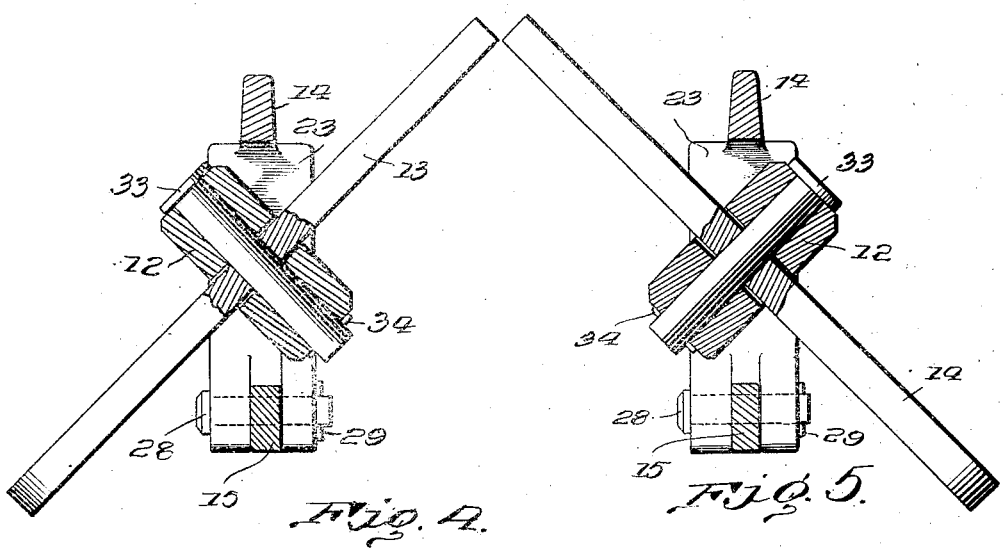

JAMES W. McGEE, OF BESSEMER, ALABAMA, ASSIGNOR OF ONE-HALF TO WALTER V. TATUM, OF ENSLEY, ALABAMA.

BRAKE-BEAM FULCRUM.

1,250,915.           Specification of Letters Patent.     Patented Dec. 18, 1917.

Application filed October 8, 1914, Serial No. 865,733. Renewed May 14, 1917. Serial No. 168,592.

*To all whom it may concern:*

Be it known that I, JAMES W. McGEE, a citizen of the United States, residing at Bessemer, in the county of Jefferson and State of Alabama, have invented certain new and useful Improvements in Brake-Beam Fulcrums, of which the following is a specification.

My invention relates to new and useful improvements in reversible brake beam fulcrums, the primary object of my invention being the provision of a fulcrum which, when once attached to the brake beam, may be employed to hold the brake lever, when in use, in connection with a right or left hand beam, being readily convertible from one to the other without removal from the beam.

A further object of my invention is the provision of a fulcrum of the above described character which when assembled about a brake beam may be firmly and rigidly secured to the brake beam by a single bolt or other fastening device and in which the mere securing of the fulcrum to the beam serves to complete the securing of the rocker or reversible block carrying the brake lever in the body of the fulcrum.

A further object of my invention is to provide a fulcrum of the above described type having a body or frame formed in upper and lower portions which together form a clamp for engagement with the brake beam and a bearing for the lever carrying rocker.

A still further object of my invention is the provision of means for facilitating the assembling of the body portions of the fulcrum frame during their application to the brake beam.

With these and other objects in view, my invention will be more fully described, illustrated in the accompanying drawings, and then specifically pointed out in the claims which are attached to and form a part of this application.

In the drawings:

Figure 1 is a perspective view of my improved brake beam fulcrum;

Fig. 2 is a top plan view of the fulcrum;

Fig. 3 is a central, vertical longitudinal sectional view of the fulcrum, parts of the frame being shown in elevation;

Fig. 4 is a transverse sectional view taken on the line 4—4 of Fig. 3, showing the brake lever in one position;

Fig. 5 is a corresponding view, showing the brake lever in reverse position.

Corresponding and like parts are referred to in the following description and indicated in all the views of the drawings by the same reference characters.

Primarily, the preferred embodiment of my invention includes a body or frame 10 adapted for clamping engagement with a conventional form of brake beam 11 and rotatably carrying a rocker or block 12 which in turn carries the brake lever 13.

More specifically, the body or frame 10 includes upper and lower frame members 14 and 15 each in the form of a metal bar, preferably rectangular in cross section and terminating at corresponding ends in clamping heads 16 and 17. These clamping heads in effect form jaws for engagement about the vertical flange of the brake beam 11 and are provided with extended flanges or lips 18 at their free ends adapted to engage against the upper and lower faces of the horizontal flange of the brake beam. It will of course be understood that the inner faces of these lips or flanges 18 lie in planes somewhat offset from the common plane of the inner faces of the remainder of the jaws or heads. These jaws or heads are further channeled interiorly as shown at 19 to seat the edges of the vertical flange of the brake beam in order to permit the inner faces of the jaws or heads to engage against each other and against the horizontal flange of the beam. The body or frame members above specified are secured to the brake beam by means of a bolt 20 passed through the lips or flanges 18, through an opening formed in the brake beam and secured against disengagement by a cotter pin 21 or other suitable fastening device. It will of course be clear that a bolt and nut or a rivet may be substituted for the pin 20 and cotter pin, if deemed advisable.

The abutting inner faces of the jaws, in addition to the transverse channels 19, are provided with longitudinal channels 22 semicircular in cross section and so formed in the respective jaws that when the frame is assembled they combine to form a cylindrical bearing for one end of the rocker block 12 as will be later set forth in detail.

The free end of the frame member 14 is formed with a downwardly directed, enlarged head 23 provided with a cylindrical bore 24 forming a second bearing in alinement with the bearing formed in the jaws of the frame. That portion of the head below the bore 24 is extended to a point on the level with the lower edge of the lower frame member 15 and such extended portion is bifurcated or slotted as shown at 25 to receive the free end of the frame member 15. The free end of this latter frame member is somewhat enlarged to more firmly seat in the slot 25 and extends somewhat beyond the outer face of the head 23 as shown at 26, this extended portion being provided with an upstanding lug or shoulder 27 which, in assembled position of the frame, engages against the outer face of the head 23 to hold the frame members against relative longitudinal movement. The arms of the head 23 of the frame member 14, formed by slotting such head member, together with the free end portion of the frame member 15, are formed with alined perforations or bores to receive a locking pin 28 or equivalent fastening device, the locking pin being held in place by a cotter pin 29.

The above described body portion or frame of the fulcrum carries the rocker block 12 which consists of a body portion which may be either cylindrical or polygonal in cross section and which extends the whole distance between the jaws or heads which clamp about the brake beam and the head 23 of the frame member 14. This rocker block is formed at its ends with axially disposed trunnions 30 and 31 adapted to seat in the bearings of the frame, whereby the rocker is free for turning movement in the frame. This rocker or block is provided centrally with a diametrically formed slot 32 through which the brake lever 13 is passed, the brake lever being pivoted intermediate its length in this slot by a pin 33 passed through alined perforations formed in the block and lever, the pin being secured against disengagement by a cotter pin 34. As clearly shown in the various figures of the drawings, the slot 32, while substantially equal in thickness to the thickness of the brake lever, is considerably longer than the width of the lever in order to permit free swinging movement of the lever axially of the block. Furthermore, the block is so proportioned that it may readily turn in the frame and the pin 33 is short enough to permit such turning. Under these circumstances, it will be clear that the block and its lever may be swung in either of the positions shown in Figs. 4 and 5 as circumstances may demand. The free ends of the lever are, of course, provided with bores or perforations 35 for attachment with the remaining brake mechanism.

The side edge portions of the clamping heads or jaws 16 and 17 are preferably strengthened by reinforcing ribs or shoulders 36, as best shown in Figs. 1 and 2 of the drawings, although such bracing is not absolutely essential. It will be clear that the pins 20 and 28 will be sufficient to hold the frame together, particularly in view of the fact that the shoulder 27 will assist in holding the free ends of the frame member against independent movement. Inasmuch as the rocker body extends throughout the length of the frame opening, it will be clear that it will be held against longitudinal movement. It will further be clear that inasmuch as the trunnion 31 of such body is journaled in a bearing formed wholly in the head 23 of the upper frame member 10, the rocker block may be positioned in the upper frame member previous to the application of the latter to the lower frame member and brake beam, thereby greatly facilitating the assembling of the fulcrum.

As will be seen, by reference to Fig. 3, that trunnion of the rocker seating in the bore 24 does not extend completely through the head 23 of the frame. Because of this, the fulcrum may be utilized with truss beams by the employment of a pin 37 seating in the outer end of the bore 25 and terminating in a truss engaging head 38 having the lower portion of its outer face concaved transversely as shown at 39 and its upper portion slotted to provide spaced perforated ears 40 to which a link may be pivoted.

The foregoing description, especially when taken in connection with the drawings, is believed to fully disclose not only the construction but the operation of the brake beam fulcrum and any further explanation is therefore deemed superfluous.

Having thus described the invention, what is claimed as new is:

1. A brake beam fulcrum including a two-part frame, the parts being adapted at one end for co-acting clamping engagement with a brake beam and provided at said end with grooves co-acting to provide a bearing when the frame is assembled, the free end of one part having a laterally projecting, slotted head to receive the laterally projecting end of the other part, a bore formed in the head adjacent the slot to provide a bearing in alinement with the first bearing, means for securing the free ends of the frame parts together, and a slotted rocker block mounted between the frame members and provided at its ends with trunnions seating in the bearings of the frame.

2. A brake beam fulcrum including a two-part frame, the parts being adapted at one end for co-acting clamping engagement with a brake beam and provided at said end with grooves co-acting to provide a bearing when the frame is assembled, the free end of one part having a laterally projecting slotted head to receive the laterally projecting end of the other part, a bore formed in the head adjacent the slot to provide a bearing in alinement with the first bearing, means for securing the free ends of the frame parts together, a slotted rocker block mounted between the frame members and provided with trunnions seating in the frame bearings, and a pin seating in the outer end of the bore and terminating in a head having a concave outer face and upwardly directed spaced ears.

3. A brake beam fulcrum including a two-part frame adapted at one end for co-acting clamping engagement with a brake beam and provided at such end with grooves co-acting to provide a bearing when the frame is assembled, the free end of one part having a laterally projecting head provided with a bore to form a bearing in alinement with the first bearing, means for securing the free ends of the frame parts together, and a rocker block journaled in the bearings of the frame.

4. A brake beam fulcrum including a two part frame, the parts being adapted at one end for co-acting clamping engagement with a brake beam, the other end of one part having a head directed toward the other part with a bifurcated terminal to receive the corresponding end of the other part, whereby the head may receive a truss engaging member, and a lever receiving rocker mounted in the frame.

5. A brake beam fulcrum including a two part frame, the parts being adapted at one end for co-acting clamping engagement with a brake beam, the other end of one part having a head directed toward the other part with a bifurcated extension to receive the corresponding end of the other part, whereby the head of the first part is adapted to receive a truss engaging member, said end of the second part having a locking shoulder engaging against the outer face of the slotted end of the head, and a rocker revolubly mounted in the frame and having a lever receiving slot.

6. A brake beam fulcrum including a two part frame, the parts being adapted at one end for co-acting clamping engagement with a brake beam, the other end of one part having a head directed toward the other part and with a bifurcated terminal to receive the corresponding end of the other part, said head, above the bifurcated terminal, being uninterrupted to adapt it to receive a truss engaging member, said end of the second part having a locking shoulder engaging against the outer face of the slotted end of the first part, means for securing that end of one part of the frame seating in tne slot of the corresponding end of the other part in such slot, and a lever receiving rocker mounted in the frame.

In testimony whereof I affix my signature in presence of two witnesses.

JAMES W. McGEE. [L. S.]

Witnesses:
MARGARET GOODWIN,
JOHN D. STUDWAY.

Copies of this patent may be obtained for five cents each, by addressing the "Commissioner of Patents, Washington, D. C."